T. J. WHITNEY.
AUTOMATIC FEEDER FOR STEAM BOILERS.
APPLICATION FILED FEB. 4, 1910.

998,142.

Patented July 18, 1911.

5 SHEETS—SHEET 1.

WITNESSES

INVENTOR
Thomas J. Whitney
BY
ATTORNEY

T. J. WHITNEY.
AUTOMATIC FEEDER FOR STEAM BOILERS.
APPLICATION FILED FEB. 4, 1910.

998,142.

Patented July 18, 1911.

5 SHEETS—SHEET 2.

WITNESSES

INVENTOR
Thomas J. Whitney
BY

ATTORNEY

T. J. WHITNEY.
AUTOMATIC FEEDER FOR STEAM BOILERS.
APPLICATION FILED FEB. 4, 1910.

998,142.

Patented July 18, 1911.
5 SHEETS—SHEET 3.

WITNESSES
Francis A Pocock
W. W. Williamson

INVENTOR
Thomas J. Whitney
BY
ATTORNEY

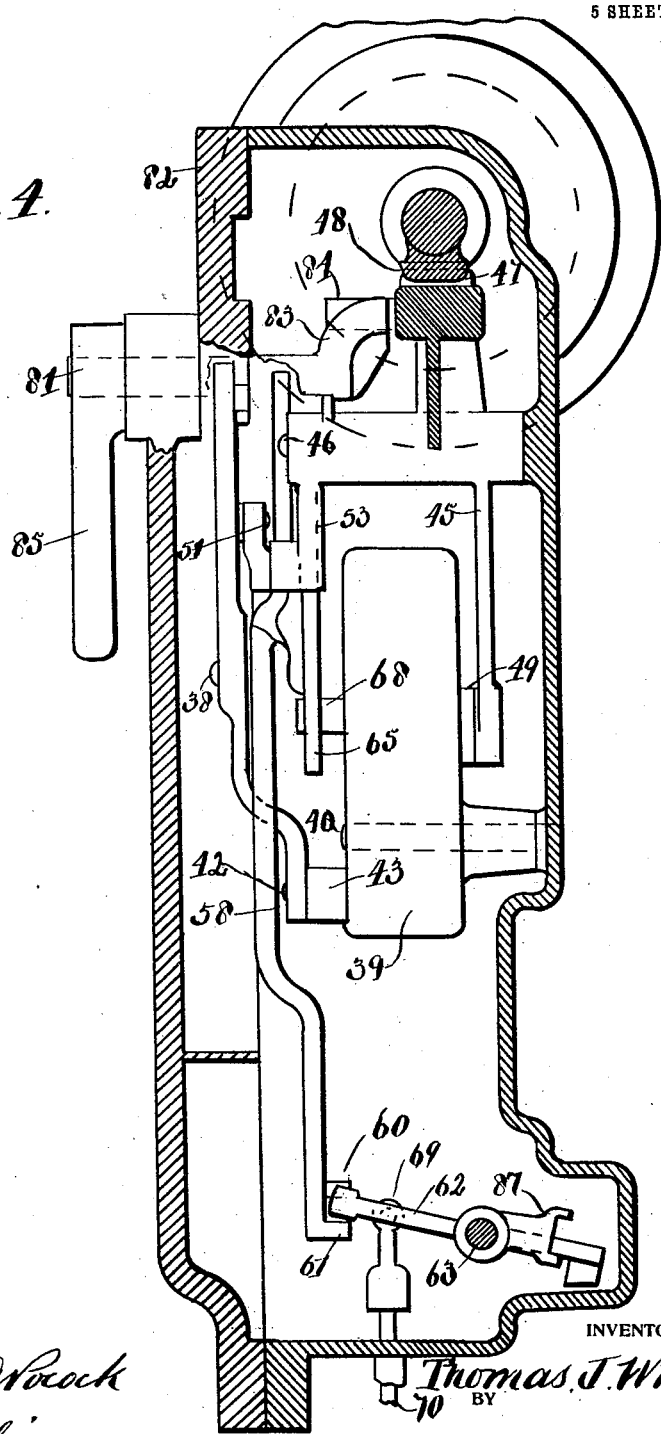

T. J. WHITNEY.
AUTOMATIC FEEDER FOR STEAM BOILERS.
APPLICATION FILED FEB. 4, 1910.
998,142.
Patented July 18, 1911.
5 SHEETS—SHEET 5.
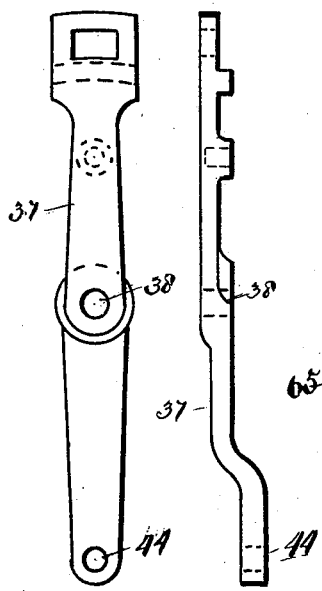
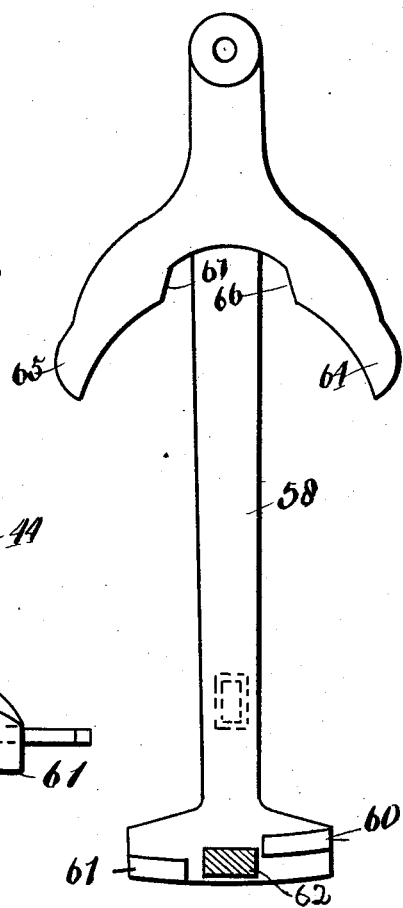
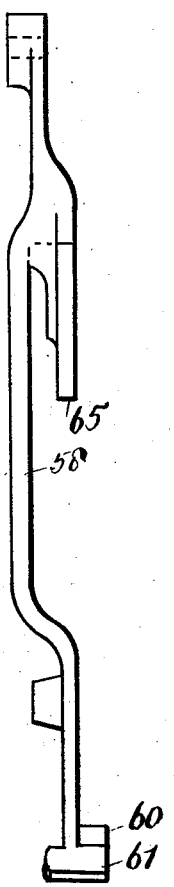
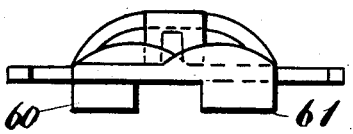
WITNESSES
INVENTOR
Thomas J. Whitney
BY
ATTORNEY
COLUMBIA PLANOGRAPH CO., WASHINGTON, D. C.

UNITED STATES PATENT OFFICE.

THOMAS JUDSON WHITNEY, OF NORRISTOWN, PENNSYLVANIA.

AUTOMATIC FEEDER FOR STEAM-BOILERS.

998,142. Specification of Letters Patent. Patented July 18, 1911.

Application filed February 4, 1910. Serial No. 542,010.

*To all whom it may concern:*

Be it known that I, THOMAS J. WHITNEY, a citizen of the United States, residing at Norristown, in the county of Montgomery and State of Pennsylvania, have invented a certain new and useful Improvement in Automatic Water-Feeders for Steam-Boilers, of which the following is a specification.

My invention relates to a new and useful improvement in automatic water feeders for steam boilers, and has for its object to so construct and combine such devices as to automatically supply water to a steam boiler under pressure by gravity, passing the water through one or more separate tanks in its course to the boiler and heating the water in the separate tanks to different degrees by live and exhaust steam, and returning the waters of condensation throughout the system back to the feed supply, and a further object of my present invention is to provide for operating by hand such portion of the mechanism as is necessary to supply water to the boiler when no steam pressure is contained therein, and a still further object of my invention is to provide for the separation of oil from the waters of condensation before the latter is returned to the feed system.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
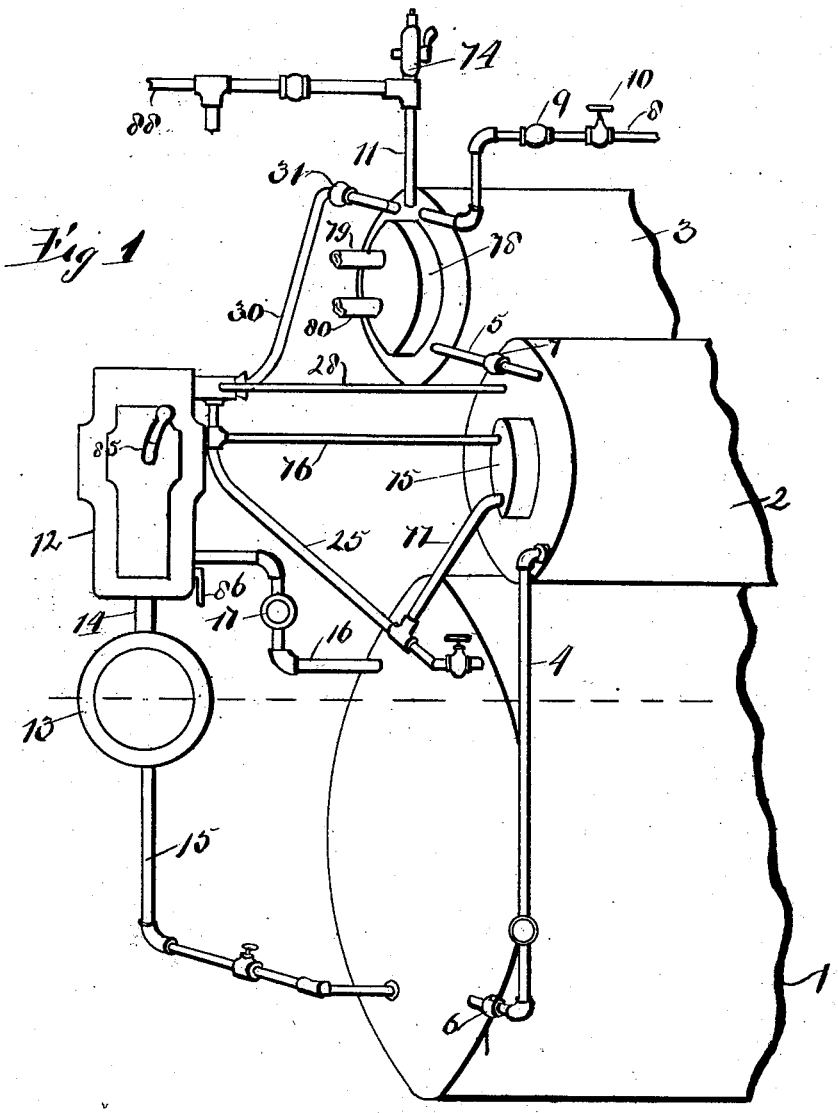
Figure 2:
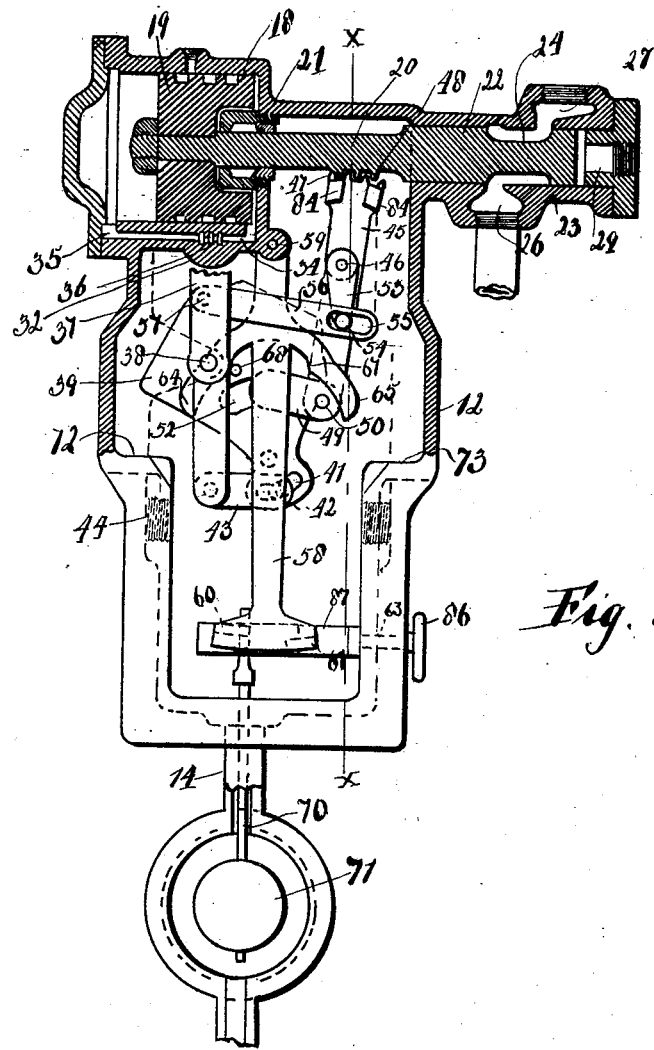
Figure 3:
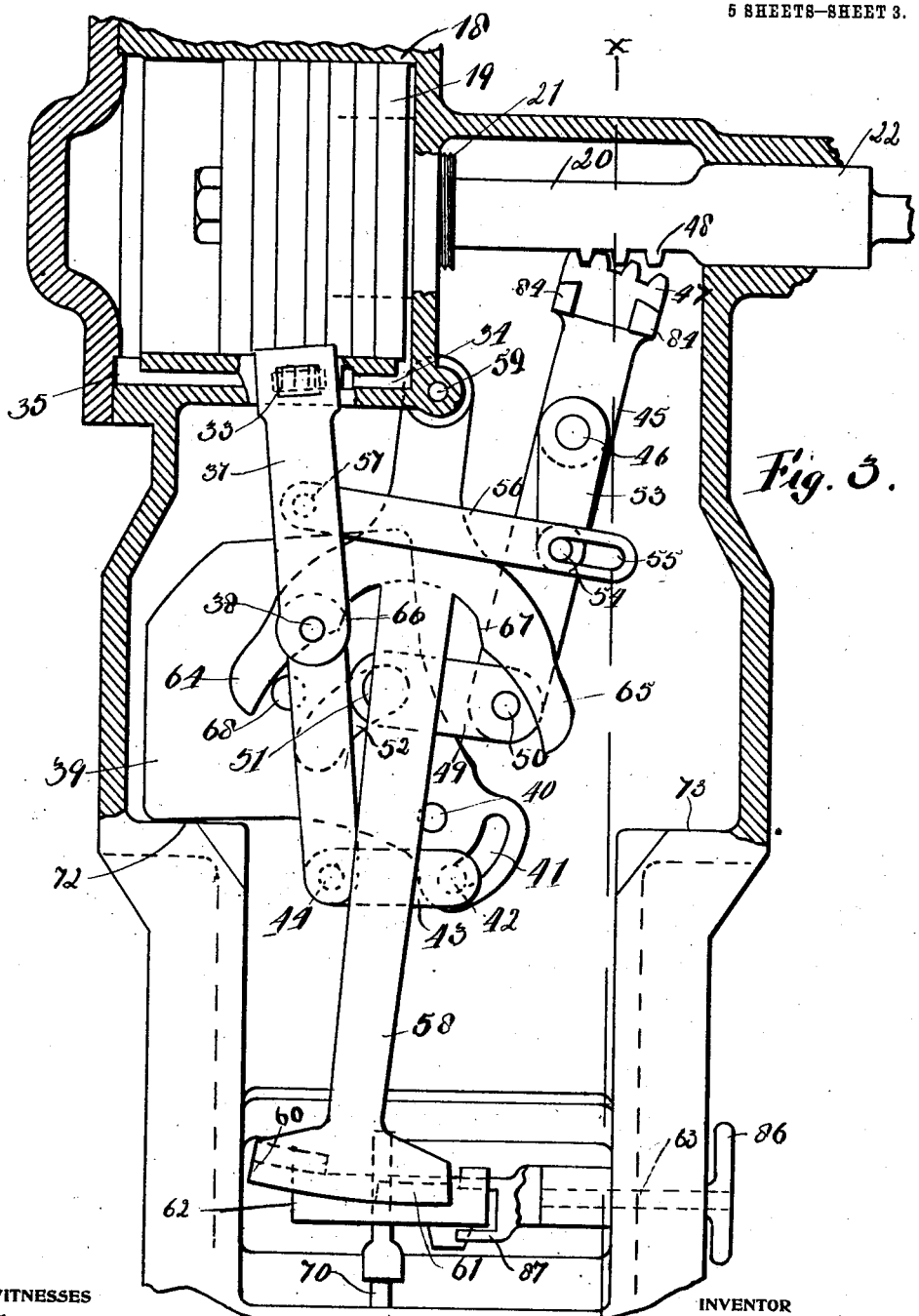

Figure 1 is a diagrammatical view in perspective, showing the relation of the various parts of my invention to a steam boiler. Fig. 2, an elevation of the casing containing the automatic mechanism, the cover being removed and portions thereof being in section to clearly show the mechanism. Fig. 3, an enlarged view of this casing, portions being broken away, the mechanism being shown in the position which it assumes when the actuating weight falls to the left. Fig. 4, a section at the line $x$—$x$ of Fig. 2. Fig. 5, a detail elevation of the pendulum which controls the action of the automatic mechanism. Fig. 6, an edge view thereof. Fig. 7, an edge view of the pendulum looking toward the bottom thereof. Fig. 8, a front elevation of the slide valve lever. Fig. 9, an edge view thereof.

In carrying out my invention as here embodied, 1 represents the boiler, above which is located the heating tank 2, and again above the level of this heating tank is the heating tank 3. The lower portion of the tank 2 is connected with the boiler below the water level in the latter by the pipe 4, and the lower portion of the tank 3 is connected with the upper portion of the tank 2 by the pipe 5, a check valve 6 being located in the pipe 4, and a similar valve 7 located in the pipe 5.

8 represents the water supply pipe leading from any suitable source to the upper portion of the tank 3 and having therein a check valve 9 and a controlling valve 10, while 11 is also a supply pipe leading from any heating system collecting condensation or drips connected with the latter to the upper portion of the tank 3.

12 represents the casing containing the automatic mechanism, with which the float casing 13 is connected by the pipe 14, and the float casing in turn is connected by the pipe 15 to the boiler below the water level therein, and this float casing is so located that the line of the water level will pass approximately through the center thereof. A pipe 16 having a hand valve 17 leads from the boiler above the water line to the casing 12, thus balancing the steam pressure in the float casing.

Within the casing 12 is formed a steam cylinder 18, in which is fitted a piston 19 after the manner of an ordinary steam engine, with which is connected the piston rod 20, the latter passing through the stuffing box 21, its outer end terminating in a valve 22. This valve is fitted to reciprocate in the valve casing 23, and has a portion thereof reduced in diameter, as indicated by 24, so as to form within the walls of the casing a channel for the passage of steam. When the valve is in the position shown in Fig.

2 steam will pass from the pipe 25 which connects with the boiler above the water level through the passage 26 and the passage 27 to the pipe 28, which connects with the upper portion of the tank 2, or when the piston valve is in the reverse position, that is to say, drawn so that its end uncovers the passage 27, steam will flow from the pipe 28 through this last named passage and the passage 29 to the pipe 30, and from thence to the upper portion of the tank 3; a check valve 31 being located in this last named pipe to prevent any back flow.

32 represents a valve seat for the slide valve 33 and from this valve seat a port 34 leads to the right hand end of the cylinder 18, and a corresponding port 35 leads to the opposite end of the cylinder, while an exhaust port 36 passes to the exterior of the casing 12 and may be connected with a pipe leading to a drip tank or any suitable point. The slide valve 33 is actuated by the lever 37, pivoted at 38 within the casing.

39 represents the actuating weight, which is pivoted at 40, its lower end being slotted, as indicated at 41, in which projects the pin 42 carried by the link 43, the latter being pivoted at 44 to the slide valve lever 37, by which arrangement the slide valve will be actuated, as hereinafter set forth.

45 is a power lever pivoted at 46, and having its upper end geared to the piston rod 20 by the teeth 47 formed thereon, meshing with the teeth 48 formed upon said piston rod, and the lower end of this lever has pivoted thereto the link 49 at 50, the free end of the link carrying a pin 51 which projects into the slot 52 formed in the actuating weight 39, thus when this power lever is moved by the piston it will in turn swing the weight upon the pivot point of the latter, for the purpose hereinafter set forth.

53 is a short lever formed with the power lever 45, and having a pin 54 which projects into the slot 55 of the link 56, which latter is pivoted at 57 to the slide valve lever 37.

58 represents what I term the pendulum, which is pivoted at 59, its lower end having the locking lugs 60 and 61 formed therewith, and 62 is a locking dog which is pivoted at 63, the nose of which projects into alinement with the locking lugs in such manner that when this dog is raised it will free the lug 61, or when lowered it will free the lug 61, thus permitting the pendulum to swing to one side or the other. This pendulum has formed therewith the wings 64 and 65 with the stop surfaces 66 and 67 respectively, against which the pin 68 projecting from the actuating weight 39 is adapted to strike.

The locking dog 62 has pivoted thereto at 69 the float stem 70, which extends down through the pipe 14 into the float casing 13, where it is secured to the float 71, and as this float rises and falls with the rising and falling of the water in the boiler, the locking dog will be raised and lowered to unlock and lock the pendulum, for the purpose hereinafter set forth.

From the foregoing description, the operation of that portion of my invention will be as follows: Assuming that the automatic mechanism is in the position shown in Fig. 2, a free passage for the steam from the boiler would be provided through the pipe 25, passage 26, passage 27 and pipe 28 to the upper portion of the tank 2, which would balance the steam pressure in this tank, thus permitting the water by gravity to flow through the pipe 4 to the boiler, but when this inflowing of water raises the level in the boiler sufficiently to raise the float 71, until the locking dog 62 releases the lug 61, the pendulum will be free to swing to the left, and as the weight at this time is supported off its center of gravity by the pin 68 resting against the stop surface 66, this weight will actuate the pendulum to the left and fall until coming in contact with the shoulder 72. This falling of the weight will draw the slide valve lever 37 to the position shown in Fig. 3, thus opening the port 34 and admitting steam from the casing 12 to the cylinder 18 upon the right of the piston, thereby driving said piston to the opposite end of the cylinder, which movement will swing the power lever 45 so as to swing the actuating weight through the link 49 from the position shown in Fig. 3 until the pin 68 strikes against the stop surface 67, after which the pendulum will support the weight upon the opposite side of its center of gravity and prevent it from falling to the shoulder 73. As soon as the pin 68 comes in contact with the stop surface 67 the pendulum will be brought to its central position, or that shown in Fig. 2, where it will be locked by the nose of the locking dog contacting with the lug 60, and will remain in this position until the float falls sufficiently to withdraw the dog from contact with this lug. When the power lever 45 was swung to the left, as just described, the lever 53 formed therewith was swung to the right, which movement brought the slide valve lever 37 and consequently the slide valve to its central position, thus shutting off the steam to the cylinder, thereby leaving the parts in their normal position ready for the next actuation. The movement of the piston to the left as just described also carries the piston valve 22 to the left sufficiently to close the communication between the passages 26 and 27 and open communication between the passages 27 and 29. This will cause the steam previously fed to the tank 2 to flow through the pipe 28, passage 27, passage 29 and pipe 30 to the tank 3, thereby balancing the pressure between these two tanks and permitting the water in tank 3 to flow by gravity into tank 2. As soon as the automatic mechanism is reversed by the change of the water level in the boiler and the steam is cut off from tank 3, the water from the supply pipes 8 and 11 will flow into tank 3 either by the pressure from the water source or by the partial vacuum created in this tank by the condensation of steam previously admitted thereto. These operations will be repeated from time to time as the water level in the boiler rises and falls, and in practice the capacity of the tanks 2 and 3 relative to the steaming capacity of the boiler may be so timed as to make these operations more or less rapid, but I prefer that they shall be sufficiently deliberate to give opportunity of raising the temperature of the water in tank 2 to three hundred and two degrees or more of heat, and the temperature of the water in tank 3 to approximately two hundred and five degrees, and as is well known this temperature in tank 3 will liberate the scale forming impurities contained in the water which latter will be blown out from tanks 2 and 3 in the form of gases through the escape valve 74, and as is also well known this heat in tank 2 will freely liberate the sulfates and precipitate the solid matter, thus purifying the water before reaching the boiler, an item of great importance in steam making.

In order that the apparatus may be actuated by hand when necessary, I journal a short shaft 81 in the cover 82 of the casing 12, which lever has formed therewith an offset 83 which projects between the lugs 84 formed upon the power lever 45, and upon this shaft is secured a hand lever 85 on the outside of the casing. By means of this hand lever the piston rod and consequently the piston valve 22 may be operated to change the flow of the steam through the passages 26, 27 and 29, when there is little or no steam pressure in the boiler. To permit the operation just described it is necessary to unlock the pendulum, and this is accomplished by the hand lever 86, which is secured upon the shaft 63, the latter having also secured thereon the forked lever 87, which engages the heel end of the dog 62, thus permitting the swinging of the dog to unlock the pendulum in order that it may move in either direction.

When there is sufficient steam pressure in the boiler and it is desired to operate the automatic mechanism independent of the float, the manipulation of the hand lever 86 will accomplish this result by unlocking the pendulum, thus bringing about the same result as though the pendulum had been unlocked by the rising or falling of the float, as will be readily understood.

The water in the tank 2 is heated by steam from the boiler entering the heater 75 through the pipe 76, pipe 77 being the return from this heater. Likewise the water in the tank 3 is heated by exhaust steam from the engine entering the heater 78 through the pipe 79, the pipe 80 being the return from this heater.

Having thus fully described my invention what I claim as new and useful is—

1. In an apparatus for automatically purifying and feeding water to steam boilers, a boiler, a plurality of tanks located above the water level of the boiler, a valve, a pipe leading from the boiler above the steam level to one of the passages of said valve, a pipe leading from another of the passages of said valve to one of the tanks, a pipe leading from the lower portion of this tank to a point below the water level in the boiler, a pipe leading from the remaining passage of the valve to the upper portion of the other tank, a pipe leading from the lower portion of the last named tank to the upper portion of the first tank, means for heating the water in the first tank by live steam to approximately boiler temperature, means for heating water in the second tank by exhaust steam, a casing, a float inclosed in said casing, a second casing with which the float casing is connected by a steam pipe, a pipe leading from below the water line of the boiler, a pipe leading from the second casing to a point above the water, automatic mechanism contained within the second casing for actuating the valve, and means connected with the float for starting and stopping the automatic mechanism, as shown and described.

2. In combination with a steam boiler, a feed water tank located above the water level of the boiler, means for heating the water in the tank with steam from the boiler, a pipe connecting said tank with the boiler below the water level in the latter, a controlling valve, a pipe leading from above the water level of the boiler, a pipe leading from the controlling valve to the upper portion of the tank, a float adapted to be raised and lowered by the rise and fall of the water level of the boiler, a cylinder, a piston fitted to slide in said cylinder, a piston valve actuated by the piston and adapted to slide or oscillate in the controlling valve casing, a weight preferably so pivoted as to fall to one side or the other of its pivot point when swung past the center of gravity, mechanism connected with said weight for admitting steam to one side or the other of the piston for actuating the piston valve, a power lever actuated by the piston for operating the weight from its center of gravity, a pendulum adapted to hold the weight in suspension upon either side of its center of gravity, and a dog to which the float is attached, said dog adapted to lock or unlock the pendulum.

3. In combination with a steam boiler, two tanks, the first tank being located above the water level of the boiler, and the second tank being located above the first tank, heaters located in the tanks, pipes connecting the tanks together and the latter with the boiler, a controlling valve to which the steam pipes connecting the boiler and the tanks are connected, a float adapted to rise and fall with the rising and falling of the water in the boiler, automatic mechanism for controlling the actuation of the valve, means to which the float is connected for stopping or starting the automatic mechanism, and two hand levers also connected with the automatic mechanism whereby the latter may be actuated independent of the float, as specified.

4. In combination with a boiler and feed water tanks therefor, a valve for controlling the flow to said tanks, a piston for actuating said valve, a cylinder in which said piston is fitted to slide, a slide valve for controlling the admission and exhaustion of steam to and from the cylinder, automatic mechanism connected with the slide valve for actuating the latter, and a float adapted to rise and fall with the rising and falling of the water in the boiler for locking and unlocking the automatic mechanism, as specified.

5. In combination with a boiler and feed water tanks therefor, a valve for controlling the flow to said tanks, a piston for actuating said valve, a cylinder in which said piston is fitted to slide, a slide valve for controlling the admission and exhaustion of steam to and from the cylinder, a weight so pivoted as to fall to one side or the other of its pivot point, a lever connecting said weight with the slide valve, a power lever connected with the piston and linked to the weight for operating it from its center of gravity, a pin projecting from the weight, a pendulum having stop surfaces or abutments formed thereon against which the pin is adapted to strike, and means for locking and unlocking the pendulum upon the rise and fall of the water level in the boiler, as specified.

6. In combination with a boiler and feed water tanks therefor, a valve for controlling the flow to said tanks, a piston for actuating said valve, a cylinder in which said piston is fitted to slide, a slide valve for controlling the admission and exhaustion of steam to and from the cylinder, a weight so pivoted as to fall to one side or the other of its pivot point, a lever connecting said weight with the slide valve, a power lever connected with the piston and linked to the weight for swinging it to one side or the other of its center of gravity, a pin projecting from the weight, a pendulum having stop surfaces formed thereon against which the pin is adapted to strike, a dog adapted to engage lugs formed upon the lower end of the pendulum, a float engaging with the dog, and a casing in which the float is located, said casing being in communication with the water and steam spaces of the boiler, as and for the purpose set forth.

7. In combination with the boiler and feed water tanks therefor, a valve for controlling the flow to said tanks, a piston for actuating said valve, a cylinder in which said piston is fitted to slide, a slide valve for controlling the admission and exhaustion of steam to and from the cylinder, a weight so pivoted as to fall to one side or the other of its pivot point, a lever connecting said weight with the slide valve, a power lever connected with the piston and linked to the weight for swinging it to one side or the other of its center of gravity, a pin projecting from the weight, a pendulum having stop surfaces formed thereon against which the pin is adapted to strike, a dog adapted to engage lugs formed upon the lower end of the pendulum, a float engaging with the dog, a casing in which the float is located, said casing being in communication with the water and steam spaces of the boiler, a hand lever connected with the power lever for actuating the automatic mechanism by hand, and a second hand lever connected with the dog for unlocking the pendulum independent of the float, as specified.

8. In an automatic mechanism for feeding water to steam boilers by gravity, the combination of a valve casing having two or more steam passages therein, a valve adapted to slide or oscillate in said casing and control the communication through these passages, a steam actuated piston for operating said valve, a weight so pivoted as to fall to one side or the other of its pivot point, means connected with said weight for controlling the movements of said valve, and a float arranged to rise and fall with the rising and falling of the water in the boiler, said float adapted to control the movements of said mechanism, as specified.

9. In combination with a boiler, two tanks, the first located above the water level of the boiler, the second tank located above the first tank, pipes connecting the boiler and tanks together, a valve for controlling the flow of steam from the boiler to the tanks and from one tank to the other, automatic mechanism adapted to operate the valve by the rise and fall of the water in the boiler, a supply pipe connected with the second tank, a drip pipe leading from the heating system to the upper portion of the second tank, and a relief valve connected with the tanks for blowing off air and gases accumulating in the system, as specified.

In testimony whereof, I have hereunto affixed my signature in the presence of two subscribing witnesses.

THOMAS JUDSON WHITNEY.

Witnesses:
GEORGE CORBION,
S. F. WILLIAMSON.

Copies of this patent may be obtained for five cents each, by addressing the "Commissioner of Patents, Washington, D. C."